US009665149B2

(12) United States Patent
Kuo et al.

(10) Patent No.: US 9,665,149 B2
(45) Date of Patent: May 30, 2017

(54) GATEWAY FOR CONTROLLING WAKEUP-ON-LAN AND SLEEP-ON-LAN

(71) Applicants: Chi-Ming Kuo, Taipei (TW); Yu-Li Kao, Taipei (TW)

(72) Inventors: Chi-Ming Kuo, Taipei (TW); Yu-Li Kao, Taipei (TW)

(73) Assignee: THROUGHTEK TECHNOLOGY (SHENZHEN) CO., LTD., Shenzhen (CN)

( * ) Notice: Subject to any disclaimer, the term of this patent is extended or adjusted under 35 U.S.C. 154(b) by 136 days.

(21) Appl. No.: 14/217,092

(22) Filed: Mar. 17, 2014

(65) Prior Publication Data

US 2015/0264124 A1  Sep. 17, 2015

(51) Int. Cl.
*G06F 1/26* (2006.01)
*H04L 12/12* (2006.01)
*H04L 29/12* (2006.01)

(52) U.S. Cl.
CPC .............. *G06F 1/266* (2013.01); *H04L 12/12* (2013.01); *H04L 61/103* (2013.01); *H04L 61/6022* (2013.01); *Y02B 60/34* (2013.01); *Y02B 60/35* (2013.01)

(58) Field of Classification Search
None
See application file for complete search history.

(56) References Cited

U.S. PATENT DOCUMENTS

| | | | |
|---|---|---|---|
| 2006/0056397 A1* | 3/2006 | Aizu | H04L 12/66 370/352 |
| 2007/0189258 A1* | 8/2007 | Kikuchi | H04L 12/2803 370/338 |
| 2011/0305239 A1* | 12/2011 | Chandrashekharachar Suvarneshwar | H04L 12/185 370/390 |
| 2012/0198040 A1* | 8/2012 | Kuo | H04L 41/00 709/223 |
| 2015/0067815 A1* | 3/2015 | Overcash | G06F 1/32 726/11 |

OTHER PUBLICATIONS

Dong et al., "A Method and Apparatus for Sleep on LAN", IP.com, IPCOM000173706D, Aug. 12, 2008.*

* cited by examiner

*Primary Examiner* — Kevin Bates
*Assistant Examiner* — Lesa Kennedy
(74) *Attorney, Agent, or Firm* — Min-Lee Teng; Litron Patent & Trademark Office

(57) ABSTRACT

The present invention discloses a gateway for controlling Wakeup-on-LAN and/or Sleep-on-LAN through the Internet. The gateway comprises a first port for establishing a P2P (point-to-point) connection to the Internet, and a second port for coupling to a Local-Area-Network (LAN) that supports Wakeup-on-LAN and/or Sleep-on-LAN, wherein the gateway collects identifications and addresses of terminal devices in the Local-Area-Network (LAN) for associating the identification codes and the addresses of the terminal devices, so that the gateway can wake up and/or sleep the terminal devices according to messages carrying the identification codes of the terminal devices on the P2P connection. In addition, the gateway can be associated with a UID (Unique identification Code) that is registered in a server, so that a remote device can send a request containing the UID of the gateway to the server to establish a P2P connection between the gateway and the remote device for waking up and/or sleeping the terminal devices in the LAN.

10 Claims, 7 Drawing Sheets

MAP OF ID AND MAC ADDRESS

| ID | MAC Address |
|----|-------------|
| 01 | HEX: 0123456789ab |
| 02 | HEX: 0223456789ab |

GATEWAY FOR CONTROLLING WAKEUP-ON-LAN AND SLEEP-ON-LAN

BACKGROUND OF THE INVENTION

I. Field of the Invention

The present invention relates to Wakeup-on-LAN or Sleep-on-LAN controlling in a Local Area Network (LAN).

II. Description of the Prior Art

Wakeup-on-LAN can wake up a computer or a NAS (Network Attached Storage) when the computer or the NAS is in a sleeping mode for saving power. However, it is not easy to wake up the computer or the NAS through the Internet or routers because the computer or the NAS only has limited L2 networking capability during the sleeping mode.

Therefore, what is needed is an effective and efficient way to perform Wakeup-on-LAN through the Internet.

SUMMARY OF THE INVENTION

One object of the present invention is to provide a solution to perform Wakeup-on-LAN through the Internet. To achieve the above object, the present invention discloses a system of performing Wakeup-on-LAN or Sleep-on-LAN through the Internet.

In one embodiment, a gateway for controlling Wakeup-on-LAN is disclosed, wherein the gateway comprises: a first port, for coupling to the Internet; and a second port, for coupling to a Local-Area-Network (LAN) that supports Wakeup-on-LAN, wherein at least one terminal device is coupled to the gateway through the Local-Area-Network (LAN), wherein the gateway is associated with a UID (Unique identification Code) that is registered in a server for establishing a P2P (point to point) connection between the gateway and at least one remote device, wherein the P2P connection is established between the gateway device and a remote device via the Internet, by sending a request that contains the UID (Unique Identification code) to the server from the remote device, wherein the remote device communicates with the gateway on the P2P connection to wake up the at least one terminal device through the second port according to at least one message received through the P2P connection.

In one embodiment, the at least one terminal device is associated with an identification for identifying the terminal device, respectively; and wherein the gateway collects the identification and the address information of each of the at least one terminal device in the Local-Area-Network (LAN), wherein the gateway wakes up the at least one terminal device through the second port according to the identification of the at least one terminal device carried in the at least one message through the P2P connection.

In one embodiment, a gateway for controlling Sleep-on-LAN is disclosed, wherein the gateway comprises: a first port, for coupling to the Internet; and a second port, for coupling to a Local-Area-Network (LAN) that supports Sleep-on-LAN, wherein at least one terminal device is coupled to the gateway through the Local-Area-Network (LAN), wherein the gateway is associated with a UID (Unique identification Code) that is registered in a server for establishing a P2P connection between the gateway and at least one remote device, wherein the P2P connection is established between the gateway device and a remote device via the Internet, by sending a request that contains the UID (Unique Identification code) to the server from the remote device, wherein the remote device communicates with the gateway on the P2P connection to put the at least one terminal device into a sleep mode through the second port according to at least one message received through the P2P connection.

In one embodiment, the at least one terminal device is associated with an identification for identifying the terminal device, respectively; and wherein the gateway collects the identification and the address information of each of the at least one terminal device in the Local-Area-Network (LAN), wherein the gateway puts the at least one terminal device into the sleep mode through the second port according to the identification of the at least one terminal device carried in the at least one message through the P2P connection.

In one embodiment, a gateway for controlling Wakeup-on-LAN is disclosed, wherein the gateway comprises: a first port for connecting to an IP router; and a second port for connecting to a Local-Area-Network (LAN) that supports Wakeup-on-LAN, wherein at least one terminal device is connected to the gateway through the Local-Area-Network (LAN), wherein each of the at least one terminal device is associated with an identification for identifying the terminal device, respectively; wherein the gateway collects the identification and the address information of each of the at least one terminal device in the Local-Area-Network (LAN), wherein the gateway wakes up a first terminal device of at least one terminal device through the second port according to the identification of the first terminal device carried in a message received through the router via the first port.

In one embodiment, the gateway has a unique identification (UID) for allowing the remote device to establish the P2P connection, wherein the unique identification is registered in a linking server and the P2P connection is established through a linking server.

In one embodiment, a gateway for controlling Sleep-on-LAN is disclosed, the gateway comprising: a first port coupling to the Internet via a routing device; and a second port coupling to a Local-Area-Network (LAN) that supports Sleep-on-LAN, wherein at least one terminal device is coupled to the gateway through the Local-Area-Network (LAN), wherein the gateway is associated with a UID (Unique identification Code) that is registered in a server for establishing a P2P connection between the gateway and a remote device, wherein the P2P connection is established between the first port of the gateway device and the remote device by sending a request that contains the UID to the server from the remote device, wherein the remote device communicates with the gateway on the P2P connection to put the at least one terminal device into a sleep mode through the second port according to at least one message received through the P2P connection.

BRIEF DESCRIPTION OF THE DRAWINGS

The foregoing aspects and many of the accompanying advantages of this invention will become more readily appreciated as the same becomes better understood by reference to the following detailed description, when taken in conjunction with the accompanying drawings, wherein.

DETAILED DESCRIPTION OF THE INVENTION

Figure 1A:
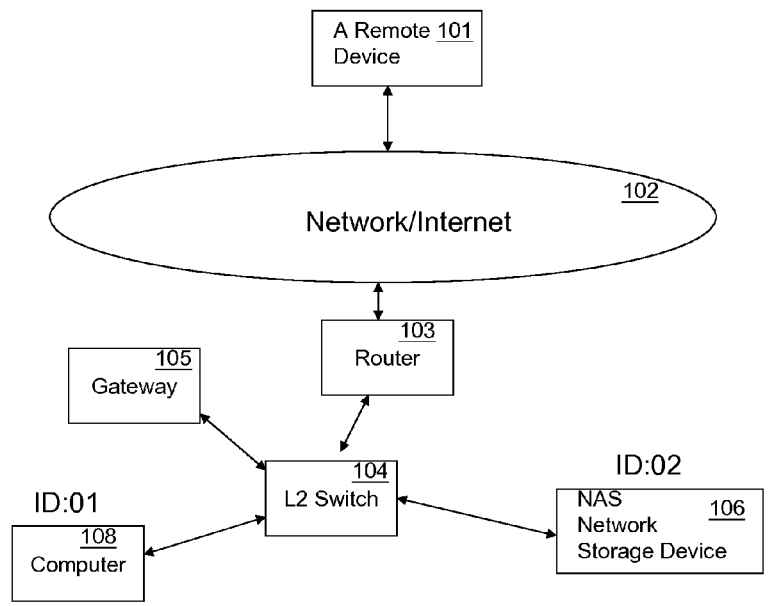
FIG. 1A-1E illustrates a schematic of a system of performing Wakeup-on-LAN or Sleep-on-LAN through routers.

The present invention provides a gateway to perform Wakeup-on-LAN through the Internet.

In one embodiment, the system to perform Wakeup-on-LAN through the Internet, wherein the system comprises: a gateway for controlling the Wakeup-on-LAN activities; a first port for connecting to a first IP network through a L3 network device such as a router; a second port for connecting to a second LAN network that connects to at least one terminal device, wherein each of the at least one terminal device has an identification for identifying the terminal device, wherein the gateway collects the identification and the address information of each of the at least one terminal device through the second LAN network, wherein the gateway wake up a first terminal device through the second port according to a message received through the router via the first port, wherein the message carries the identification of the first terminal device.

FIG. 1A-1E illustrates a schematic of a system of performing Wakeup-on-LAN or Sleep-on-LAN through routers; Please refer to FIG. 1A which illustrates a schematic 100 of a system to perform Wakeup-on-LAN through a router device which connects to Internet or an IP network 102, wherein the system includes a gateway 105, a router 103, a first terminal device such as a computer 108 and a second terminal device such as a NAS (Network Storage Device) 106, wherein the computer 108, the NAS 106 and the gateway 105 are connected through a L2 LAN switch 104. Each of the terminal devices can be, but not limit to, a portable electronic device, desktop computer, server, notebook or NAS.

In this embodiment, the computer 108 has an identification code 01 and the NAS 106 has an identification code 02. The identification codes can be configured into the computer 108 or the NAS 106 respectively through a management interface or programmed into a flash device in the computer 108 or the NAS 106. Please note that the identification code can be in many forms such as using digits, characters, or in combination of them.

Figure 1B:
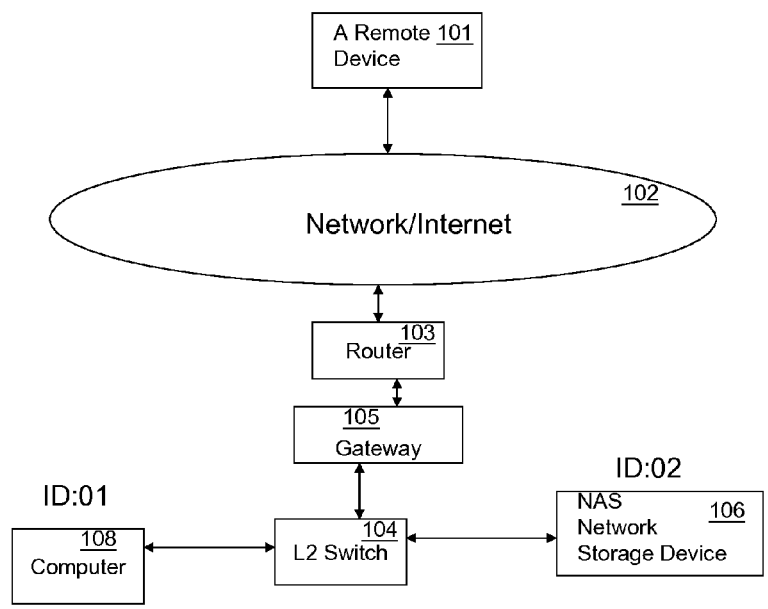
Figure 1C:
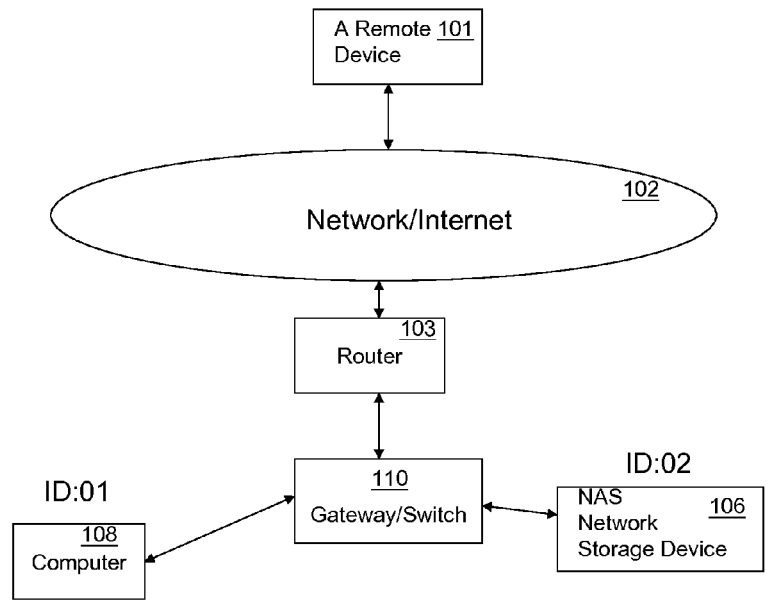
Figure 1D:
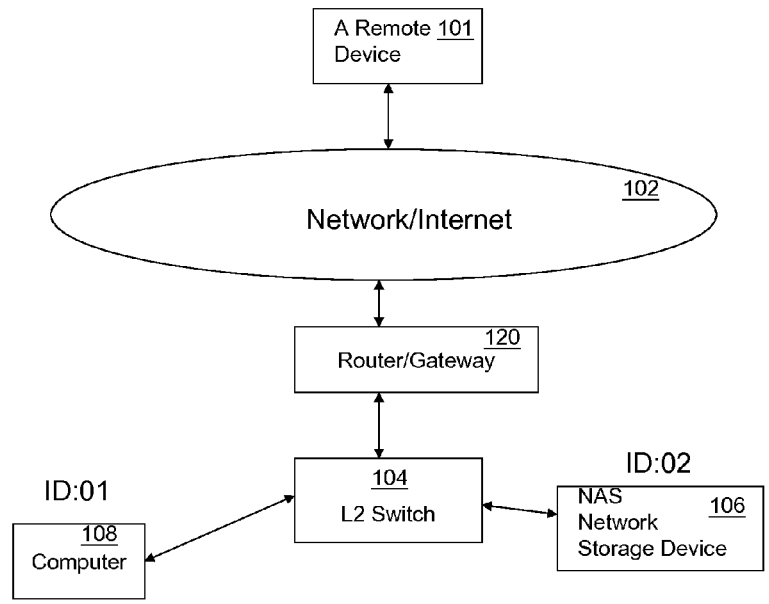
Figures 1E, 2:
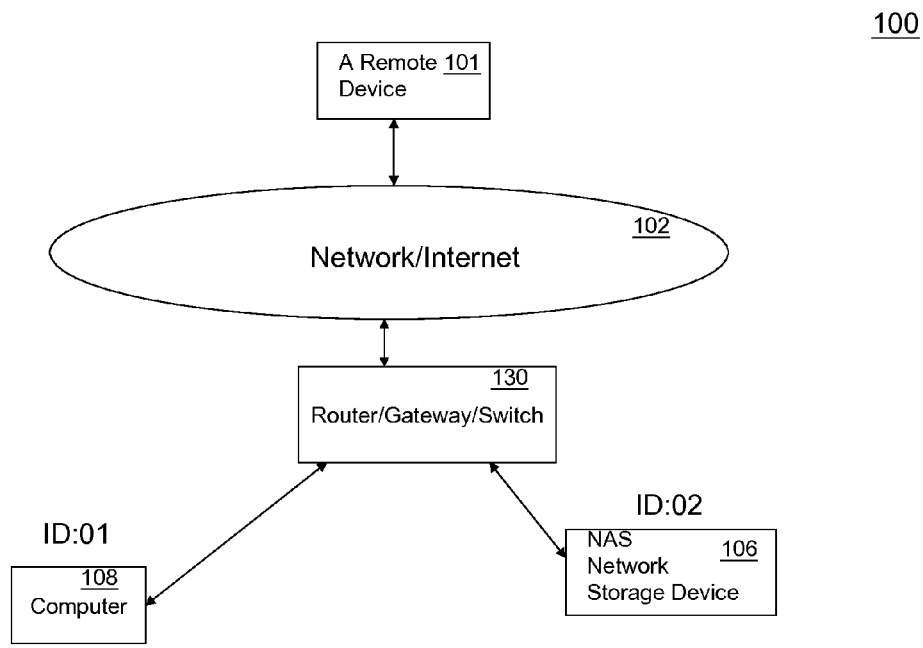
FIG. 2 illustrates a map of associating an identification of a terminal device to a MAC address of the terminal device.

FIG. 2 illustrates a map of associating an identification of a terminal device to a MAC address of the terminal device. The computer 108 or the NAS 106 will communicate with the gateway 105 with its identification so that the gateway 105 can collect them and create a map to associate each identification code to a network address such as a MAC address or a local IP address of the computer 108 or the NAS 106 respectively, as shown in FIG. 2. Alternatively, the identification code can be entered through a management interface of the gateway 105 to associate the identification code of the computer 108 or the NAS 106 with their address information, respectively. After the gateway 105 creates the map to map each identification code to its corresponding network address as shown in FIG. 2, the gateway 105 acts a proxy to communicate with a remote device 101 to receive commands or messages so as to wake up the terminal devices through Wakeup-on-LAN protocol according to the identification code carried in the received commands or messages. By doing so, a user can wake up the computer 108 or the NAS 106 at home through the Internet while away from home. That is, the computer 108 and the NAS 106 can be in sleeping mode and will be woken up when needed so as to save energy. In one embodiment, a password can be carried in the received commands or messages for security purpose; and the gateway 105 will perform the wakeup or sleeping operations if the password matches a pre-determined password.

Please note that the gateway 105 can also send commands to the computer 108 or the NAS 106 to put the computer 108 or the NAS 106 into sleeping mode while the computer 108 or the NAS 106 is running. That is, the Wakeup-on-LAN and the Sleep-on-LAN can be integrated into the gateway 105 to save cost and simplify the operations. In other words, the computer 108 or the NAS 106 does not need to support direct sleeping control from a remote device.

In one embodiment, the gateway 105 can be a standalone device and connected to a router 103 as shown in FIG. 1B. By doing so, all the Wakeup-on-LAN or Sleep-on-LAN protocols will be transparent to the router 103 because the router 103 will not see those messages for controlling Wakeup-on-LAN or Sleep-on-LAN.

In one embodiment, the gateway 105 can be integrated in to the L2 switch 110 as shown in FIG. 1C. In one embodiment, the gateway 105 can be integrated into the router/gateway device 120 as shown in FIG. 1D, or the gateway 105 can be integrated into the router/gateway/switch device 130 as shown in FIG. 1E. That is, the location of the gateway 105 can be in many different places.

Figure 3:
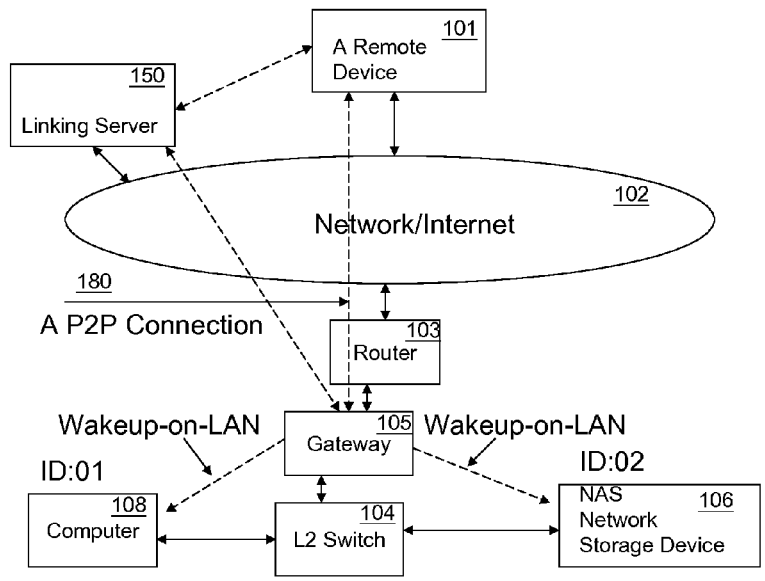
FIG. 3 illustrates a schematic of a system of performing Wakeup-on-LAN through a P2P connection.

FIG. 3 illustrates a schematic of a system of performing Wakeup-on-LAN through a P2P connection. In one embodiment, a P2P connection 180 is established between the gateway 105 and the remote device 101 as shown in FIG. 3; and the remote device 101 can wake up the computer 108 or the NAS 106 remotely as shown in FIG. 3.

In one embodiment, a P2P connection can be established between the gateway 105 and the remote device 101 through a port mapping by the router.

In one embodiment, a P2P connection can be established between the gateway 105 and the remote device 101 through UPnP protocol.

Figure 4:
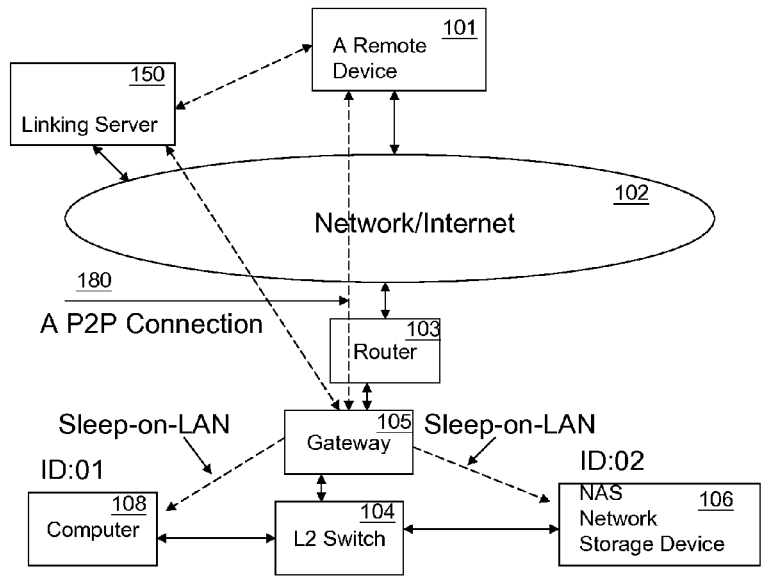
FIG. 4 illustrates a schematic of a system of performing Sleep-on-LAN through a P2P connection.

FIG. 4 illustrates a schematic of a system of performing Sleep-on-LAN through a P2P connection. In one embodiment, a P2P connection 180 is established between the gateway 105 and the remote device 101 as shown in FIG. 4, wherein the P2P connection is establish by a linking server 150 and the remote device 101 can put the computer 108 or the NAS 106 into a sleep mode remotely.

The following describes the way to establish the P2P connection 180 in FIG. 3 and FIG. 4 using the linking server 150.

This application is related to U.S. patent application Ser. No. 13/950,282, which is incorporated by reference herein and made a part of the specification. As described in U.S. patent application Ser. No. 13/950,282, the gateway device 105 can register its UID (Unique Identification) into the linking server 150, and a remote device 101 can then communicate with the linking server 150 to establish a P2P connection from the remote device to the gateway device. As long as the remote device has the information of the UID of the gateway device, the remote device can contact the linking server to make a P2P connection to the gateway device. Please note that the UID can be in many forms to identify the gateway device 105, such as digital numbers, characters, MAC address, texts, or a combination of them.

Figure 5:
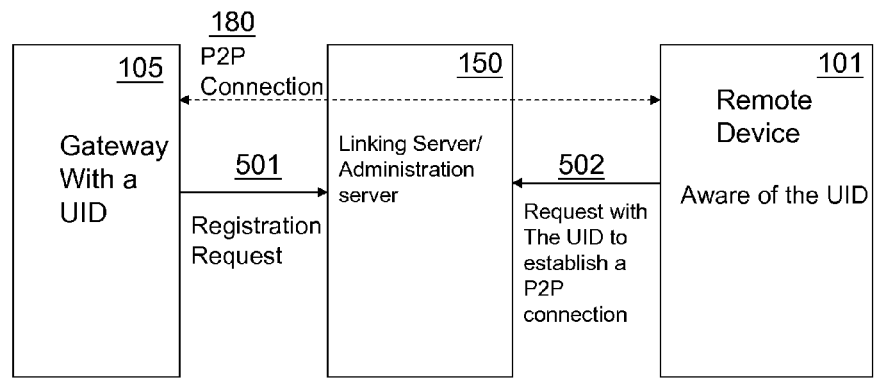
FIG. 5 illustrates a schematic of a system for establishing a P2P connection by using a Unique Identification associated with a gateway and a linking server.

FIG. 5 illustrates a diagram for establishing the P2P connection between the gateway device 105 and the remote device 101 using the linking server 150. The gateway device 105 has a UID (Unique Identification Code) that can be registered in the linking server 150 directly or in an administration server administering the linking server 150 through a registration request 501. As long as the remote device 101 knows the UID of the gateway 105, the remote device 101 can make a request to the link server 150 or the administration server to establish a P2P connection between the remote device 101 and the gateway 105 which has the UID that the remote device 101 intends to connect. The linking server 150 will eventually communicate with the remote device 101 and the gateway 105 to establish a P2P connection. For example, the remote device 101 such as a mobile phone can make a request 502 that contains the UID for establishing a P2P connection to the gateway device 105, which is associated with the UID, through the linking server 150 directly, or through the administration server to obtain the address of the linking server first so that the linking server can be contacted by the remote device 101, for establishing the P2P connection 180 between the gateway device and the remote device 101. The P2P connection 180 can be set up quickly in this way without complex procedures. Please note that the remote device 101 is not required to have a UID for registration in the server when the P2P connection 180 is established.

Figure 6:
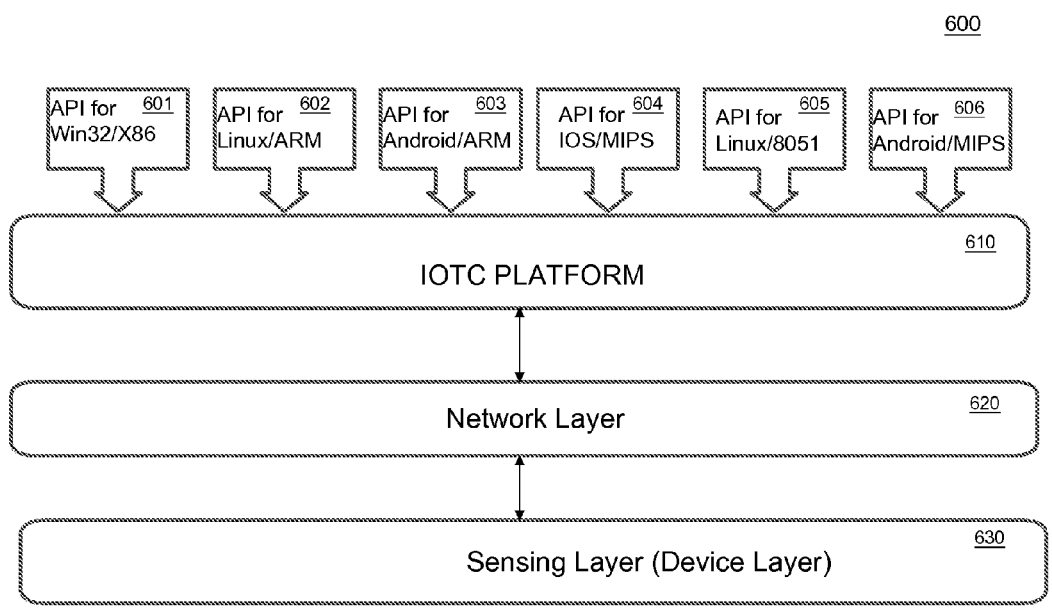
FIG. 6 illustrates the architecture of the IOTC (Internet of Things Cross-platform) in accordance with one embodiment of present invention

FIG. 6 illustrates the architecture of the IOTC (Internet of Things Cross-platform) 600 in accordance with one embodiment of present invention. An application layer requests P2P service through an API (application programming interface) 601, 602, 603, 604, 605, 606 for establishing P2P connections through IOTC platform 610, thereby providing an uniform and integrated solution across platforms with different processors, such as ARM, X86, MIPS, etc., or operating systems, such as Windows, Linux, IOS, Android, etc. Furthermore, a networking layer is provided to communicate with another IOTC platform; and a sensing layer or a device layer for connecting to other devices such as IP cam, RFID, etc.

Figure 7:
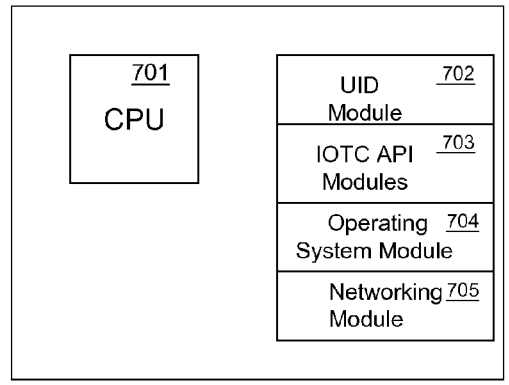
FIG. 7 illustrates a block diagram of a gateway device in accordance with one embodiment of present invention.

FIG. 7 illustrates a block diagram of a gateway device in accordance with one embodiment of present invention. In one embodiment, as shown in FIG. 7, the gateway device 700 has a UID (Unique Identification) module 702, IOTC API modules 703, an operating system module 704 and a networking module 705. The UID module 702 performs a registration process to register the gateway device 700 into administration or linking servers so that other remote devices can establish P2P connections with gateway device 700 through the Internet.

Figure 8:
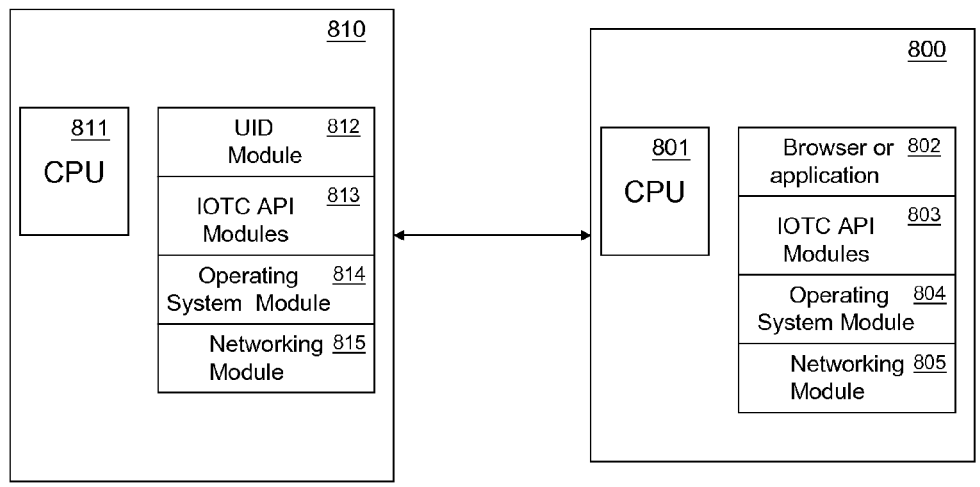
FIG. 8 illustrates a block diagram of two connected devices when a P2P connection is established by an administration server and a linking server

FIG. 8 illustrates a block diagram of two connected devices when a P2P connection is established by an administration server and a linking server, wherein one of the two connected devices is a client device 800, and the other one is a gateway device 810. As shown in FIG. 8, the gateway device 810 has a CPU 811, a UID (Unique Identification) module 812, IOTC API modules 813, an operating system module 814 and a networking module 815. The UID module 812 performs a registration process to register the gateway device 810 into administration or linking servers so that the client device 800 can establish P2P connections with the gateway device 810. The client device 800 has a CPU 801, a browser or an application module 802, IOTC API modules 803, an operating system module 804 and a networking module 805. The browser or application module 802 can establish P2P connections with the gateway device 810 through the API module via the Internet.

This application is related to U.S. patent application Ser. No. 13/950,281, which is incorporated by reference herein and made a part of the specification. As described in U.S. patent application Ser. No. 13/950,281, an image sensor can be used to generate an image of a pattern, such as a one dimensional Bar Code, QR code, or AR (Augmented Reality) code for inputting the UID of the gateway device to a remote device, to establish a P2P connection from the remote device to the gateway device via the internet. For example, a remote device, such as a mobile phone, can input the UID of the gateway through an image pattern that contains the UID of the gateway by the one dimensional Bar Code, QR code, or AR code. In addition, the AR code can link with some APP(s) (applications) so that a mobile phone user can interact with static or moving pictures to establish a P2P connection between the mobile phone and the gateway in a user friendly way.

Please note that all the descriptions in U.S. patent application Ser. No. 13/950,281 and U.S. patent application Ser. No. 13/950,282 can be integrated in whole or in part with the gateway device for establishing a P2P connection with a remote device, such as a mobile phone, notebook, PC PAD, or other suitable electronic devices.

Please note that there are many ways to establish P2P connections between the gateway device and a remote device through the Internet, and present invention is not limited to the ways of establishing the P2P connections, as long as a P2P connection is used for connecting the gateway device and the remote device.

Figure 9:
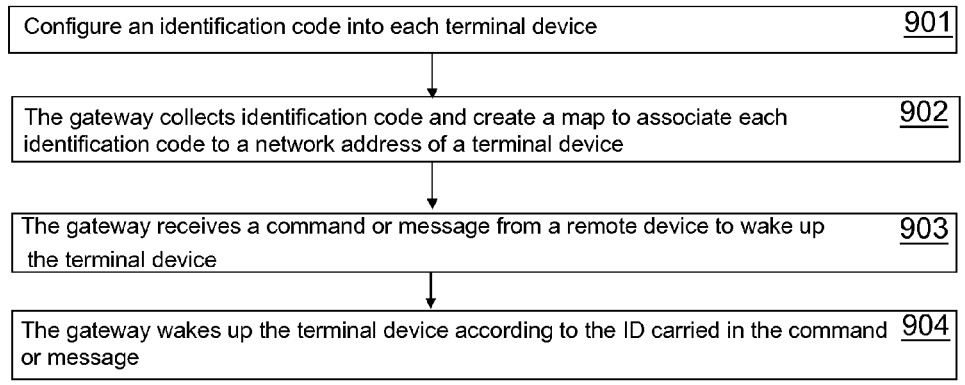
FIG. 9 depicts a flowchart to perform Wakeup-on-LAN through the Internet or routers.

Please refer to FIG. 9 which depicts a flowchart of performing Wakeup-on-LAN through a router which is connected to the Internet or an IP network. As shown FIG. 9, in step 901, configure an identification code into each terminal device, such as a computer or NAS through a management interface, or an identification code can be programmed into a flash device in the computer or the NAS, respectively.

Please note that the identification code can be in many forms such as using digits, characters, or in combination of them. In this case, the computer or the NAS will communicate with the gateway with its identification, so that the gateway can collect them and create a map to associate each identification code to a network address, such as a MAC address or a local IP address of the computer or the NAS, respectively as shown in step 902. Alternatively, the identification code can be entered through a management interface of the gateway to associate the identification code of the computer or the NAS with their address information respectively. After the gateway creates the map to map each identification code to its corresponding network address, the gateway acts a proxy to communicate with a remote device to receive commands or messages so as to wake up the terminal devices through Wakeup-on-LAN protocol according to the identification code carried in the received commands or messages as shown in step 903. By doing so, a user can wake up the computer or the NAS at home through the Internet while away from home as shown in step 904. That is, the computer and the NAS can be in sleeping mode and will be woken up when needed so as to save energy.

In one embodiment, a password can be carried in the received commands or messages for security purpose; and the gateway will perform the wakeup or sleeping operations if the password matches a pre-determined password.

Please note that the gateway can also send commands to the computer or the NAS to put the computer or the NAS into sleeping mode while the computer or the NAS is running. That is, the Wakeup-on-LAN and the Sleep-on-LAN can be integrated into the gateway to save cost and simplify the operations. In other words, the computer or the NAS does not need to support direct sleeping control from a remote device.

Figure 10:
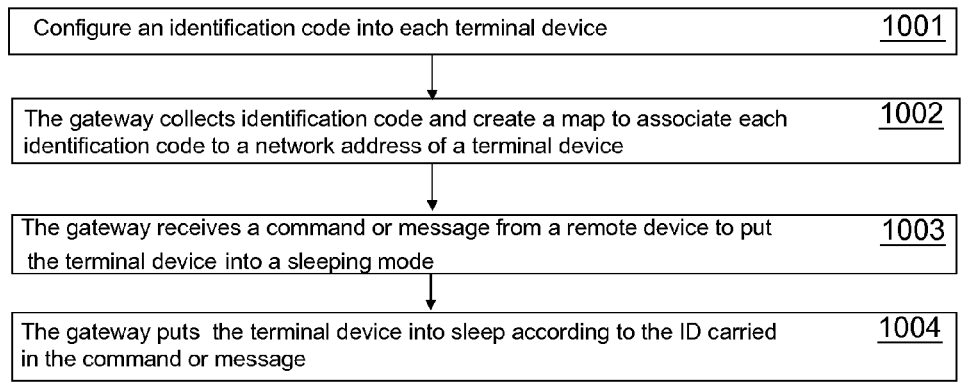
FIG. 10 depicts a flowchart to perform Sleep-on-LAN through the Internet or routers.

Please refer to FIG. 10 which depicts a flowchart of performing Sleep-on-LAN through a router which is connected to the Internet or an IP network. The flowchart is similar to the FIG. 9, so the descriptions of the FIG. 9 can be applied to FIG. 10; therefore, it is not further described herein.

The present invention provides a way to control the Wakeup-on-LAN or Sleep-on-LAN through a P2P connection. The complex addressing information of the terminal devices in a LAN can be hided through an ID mapping from the addressing information to the terminal devices, so that a remote device, such as a mobile phone, can control the terminal devices according to the ID(s) of the terminal devices without knowing the complex addressing information of the terminal devices.

The foregoing descriptions of specific embodiments of the present invention have been presented for purposes of illustrations and description. They are not intended to be exclusive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to particular use contemplated. It is intended that the scope of the invention be defined by the claims appended hereto and their equivalents.

What is claimed is:

1. A gateway for controlling Wakeup-on-LAN and Sleep-on-LAN, comprising:
   a first port, for coupling to the Internet; and
   a second port, for coupling to a Local-Area-Network (LAN) that supports Wakeup-on-LAN protocol and Sleep-on-LAN protocol, wherein at least one terminal device is connected to the gateway in the Local-Area-Network (LAN), wherein each of the at least one terminal device is associated with an identification for identifying the terminal device, respectively;
   wherein the gateway has integrated support for both of the Wakeup-on-LAN protocol and Sleep-on-LAN protocol, wherein the gateway collects an identification and an address of each of the at least one terminal device in the Local-Area-Network (LAN) to associate the identification with the address of the terminal device, wherein a P2P (point-to-point) connection is established between the gateway and a remote device through the Internet, wherein the gateway wakes up a first terminal device of the at least one terminal device or put said first terminal device into a sleep mode through the second port according to a command carrying the identification of the first terminal device and terminated at the gateway via the P2P connection.

2. The gateway according to claim 1, wherein the gateway is associated with a UID (Unique identification) that is registered in a server for establishing the P2P connection between the gateway and the remote device, wherein the P2P connection is established between the gateway device and the remote device via the Internet, by sending a request that contains the UID (Unique Identification) to the server from the remote device.

3. The gateway according to claim 1, wherein the P2P connection is established between the gateway and the remote device through UPnP protocol.

4. The gateway according to claim 1, wherein the at least one terminal device and the gateway are connected to a LAN switch, and the LAN switch is connected to a router for connecting to the Internet.

5. The gateway according to claim 1, wherein the at least one terminal device is connected to the gateway that is integrated with a LAN switch, wherein the integrated gateway is connected to a router for connecting to the Internet.

6. The gateway according to claim 1, wherein the at least one terminal device is connected to a LAN switch, wherein the gateway is connected to the LAN switch and a router for connecting to the Internet.

7. The gateway according to claim 1, wherein the at least one terminal device is connected to the gateway that is integrated with a LAN switch and a router for connecting to the Internet.

8. The gateway according to claim 1, wherein an identification is entered into each terminal device through a management interface of the terminal device, wherein each of the at least one terminal device sends the identification to the gateway for creating a map to associate the identification with a MAC address of the terminal device.

9. A gateway for controlling Wakeup-on-LAN and Sleep-on-LAN, comprising:
   a first port, for coupling to the Internet; and
   a second port, for coupling to a Local-Area-Network (LAN) that supports Wakeup-on-LAN protocol and Sleep-on-LAN protocol, wherein at least one terminal device is coupled to the gateway through the Local-Area-Network (LAN), wherein the gateway is associated with a UID (Unique identification) that is registered in a server for establishing a P2P connection between the gateway and at least one remote device, wherein a P2P connection is established between the gateway device and a remote device via the Internet, by sending a request that contains the UID (Unique Identification) to the server from the remote device, wherein each of the at least one terminal device is associated with an identification for identifying the terminal device, respectively and the gateway collects the identification and the address information of each of the at least one terminal device in the Local-Area-Network (LAN), wherein the gateway has integrated support for both of the Wakeup-on-LAN protocol and Sleep-on-LAN protocol, wherein the gateway wakes up a first terminal device of the at least one terminal device or put said first terminal device into a sleep mode through the second port according to a command carrying the identification of the first terminal device and terminated at the gateway via the P2P connection.

10. The gateway according to claim 9, wherein a corresponding identification is entered into each terminal device for identifying the terminal device through a management interface of the terminal device, wherein each of the at least one terminal device sends the identification of the terminal device to the gateway for creating a map to associate the identification of the terminal device with a MAC address of the terminal device.

* * * * *